United States Patent
Li

(10) Patent No.: US 11,654,923 B2
(45) Date of Patent: May 23, 2023

(54) ACT-OF-LOOKING-ASIDE DETERMINATION DEVICE

(71) Applicant: HONDA MOTOR CO., LTD., Tokyo (JP)

(72) Inventor: Yiyang Li, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 17/676,245

(22) Filed: Feb. 21, 2022

(65) Prior Publication Data

US 2022/0315009 A1 Oct. 6, 2022

(51) Int. Cl.
*B60W 40/08* (2012.01)
*B60W 40/072* (2012.01)
(Continued)

(52) U.S. Cl.
CPC ............ *B60W 40/08* (2013.01); *B60W 40/04* (2013.01); *B60W 40/072* (2013.01); *B60W 50/14* (2013.01); *G06V 20/58* (2022.01); *G06V 20/597* (2022.01); *G06V 40/171* (2022.01); *G06V 40/18* (2022.01); *B60W 2050/143* (2013.01); *B60W 2050/146* (2013.01); *B60W 2420/42* (2013.01); *B60W 2520/14* (2013.01); *B60W 2540/18* (2013.01); *B60W 2540/225* (2020.02); *B60W 2540/229* (2020.02); *B60W 2552/30* (2020.02); *B60W 2554/4044* (2020.02)

(58) Field of Classification Search
CPC .... B60W 40/08; B60W 40/04; B60W 40/072; B60W 50/14; B60W 2050/143; B60W 2050/146; B60W 2420/42; B60W 2520/14; B60W 2540/18; B60W 2540/225; B60W 2540/229; B60W 2552/30; B60W 2554/4044; G06V 20/58; G06V 20/597; G06V 40/171; G06V 40/18

See application file for complete search history.

(56) References Cited

U.S. PATENT DOCUMENTS 10,890,980 B2 * 1/2021 Nakajima ............ G06V 20/597
2009/0273687 A1 * 11/2009 Tsukizawa ................ G06T 7/74
348/222.1
(Continued)

FOREIGN PATENT DOCUMENTS

JP 5184596 B2 4/2013

*Primary Examiner* — Mohamed Barakat
(74) *Attorney, Agent, or Firm* — CKC & Partners Co., LLC

(57) ABSTRACT

The present invention provides an act-of-looking-aside determination device in which a determination reference range changer changes a determination reference range in an act-of-looking-aside determiner by a predetermined angle in a curve direction based on information on a curve direction detected by a curve detector, while when a line-of-sight direction of a driver detected by a line-of-sight direction detector follows a relative direction of another vehicle acquired by a relative direction acquirer as viewed from an own vehicle with respect to the other vehicle detected by an other-vehicle detector, it is not determined that the driver is looking aside even when the line-of-sight direction is out of the determination reference range not corresponding to an act of looking aside. Thus, an erroneous determination of an act of looking aside can be prevented.

6 Claims, 4 Drawing Sheets

(51) Int. Cl.
*B60W 50/14* (2020.01)
*G06V 20/59* (2022.01)
*G06V 20/58* (2022.01)
*G06V 40/18* (2022.01)
*G06V 40/16* (2022.01)
*B60W 40/04* (2006.01)

(56) References Cited

U.S. PATENT DOCUMENTS

| | | |
|---|---|---|
| 2012/0057749 A1 | 3/2012 | Takahashi et al. |
| 2018/0264940 A1* | 9/2018 | Torii ................... G06V 40/18 |
| 2019/0236386 A1* | 8/2019 | Yu ...................... G02B 27/0093 |
| 2020/0385012 A1* | 12/2020 | Maruyama ............ G06V 20/56 |
| 2021/0081690 A1* | 3/2021 | Inagaki .................. G06T 7/97 |

* cited by examiner

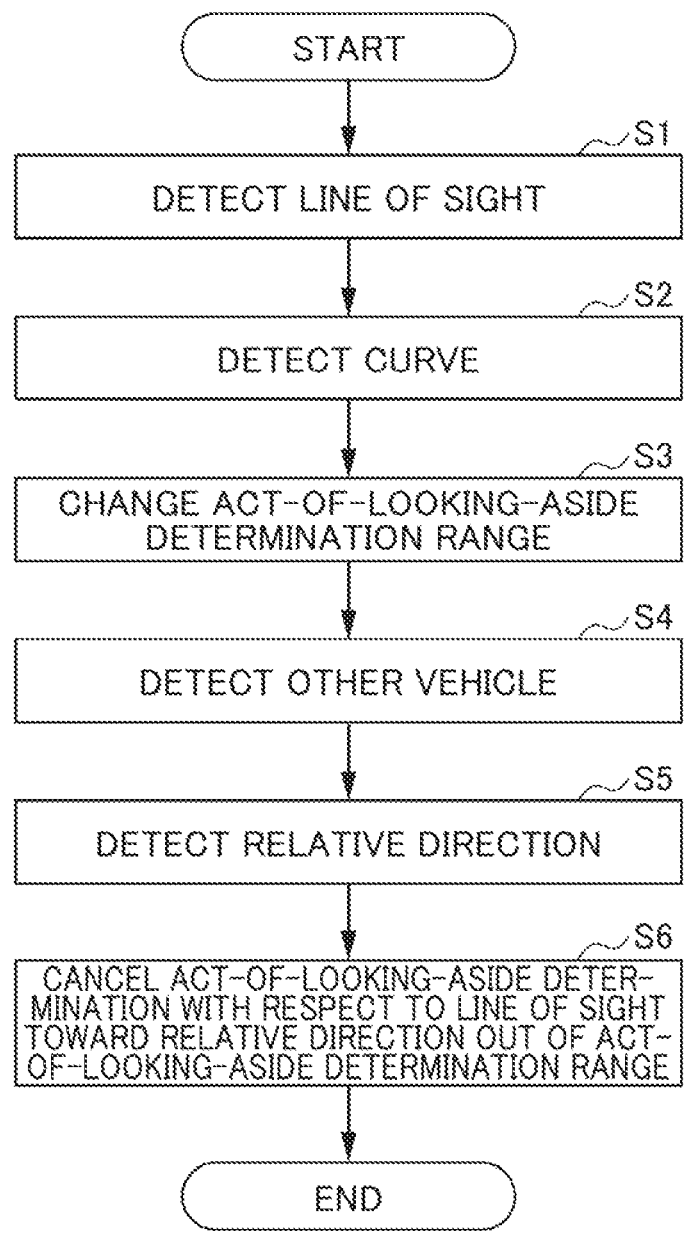

ACT-OF-LOOKING-ASIDE DETERMINATION DEVICE

This application is based on and claims the benefit of priority from Japanese Patent Application No. 2021-059062, filed on 31 Mar. 2021, the content of which is incorporated herein by reference.

BACKGROUND OF THE INVENTION

Field of the Invention

The present invention relates to an act-of-looking-aside determination device.

Related Art

In recent years, various types of act-of-looking-aside determination devices have been proposed for determining an act of looking aside of a driver. The present applicant has already proposed an act-of-looking-aside determination device to prevent erroneous determination that an act that is not looking aside is an act of looking aside by way of displacing a target range related to the determination of the act-of-looking-aside by a predetermined amount at a timing before a vehicle behavior changes and a turning direction of the vehicle changes to a curve direction (see, for example, Patent Document 1).

Patent Document 1: Japanese Patent No. 5184596

SUMMARY OF THE INVENTION

According to the act-of-looking-aside determination device disclosed in Patent Document 1, it is possible to improve determination accuracy as to whether the driver is looking aside even when entering a curve or passing through a curve. On the other hand, when the velocity of the own vehicle is slow, it is easy for another vehicle to cut into the traveling lane where the own vehicle is traveling. In such a case, the driver's line of sight to the other vehicle exhibiting the behavior of trying to cut into the lane may be determined to be an act of looking aside during driving. However, such a point is not particularly mentioned as a technical problem for the technique disclosed in Patent Document 1.

The present invention has been made in view of the above circumstances, and is directed to providing an act-of-looking-aside determination device capable of preventing an erroneous determination of an act of looking aside even when there is another vehicle that exhibits a behavior of cutting into a lane where own vehicle is traveling.

(1) The present invention provides an act-of-looking-aside determination device including: a line-of-sight direction detector (for example, a line-of-sight direction detector 24 to be described below) that detects a line-of-sight direction of a driver; an act-of-looking-aside determiner (for example, an act-of-looking-aside determiner 27 to be described below) that determines that the driver is looking aside when the line-of-sight direction detected by the line-of-sight direction detector deviates from a predetermined determination reference range; a curve detector (for example, a curve detector 26 to be described below) that detects presence or absence of a curve in front of an own vehicle within a predetermined distance from the own vehicle, and detects a curve direction of the curve, and outputs a detection result; a surrounding information acquirer (for example, a surrounding information acquirer 29 to be described below) that acquires surrounding information of the own vehicle; an other-vehicle detector (for example, an other-vehicle detector 30 to be described below) that detects, based on the surrounding information of the own vehicle, presence or absence of an other vehicle in a lane that is adjacent, in a direction opposite to the curve direction detected by the curve detector, to an own lane where the own vehicle travels, while the own vehicle is traveling around the curve; a determination reference range changer (for example, a determination reference range changer 28 to be described below) that, when the own vehicle enters the curve, changes the determination reference range in the act-of-looking-aside determiner by a predetermined angle in the curve direction detected by the curve detector; and a relative direction acquirer (for example, a relative direction acquirer 31 to be described below) that acquires, by an arithmetic operation, relative direction information indicating a relative direction of the other vehicle as viewed from the own vehicle. When the line-of-sight direction detected by the line-of-sight direction detector is within a predetermined range from the relative direction of the other vehicle acquired by the relative direction acquirer, the act-of-looking-aside determiner does not determine that the driver is looking aside even when the line-of-sight direction is out of the determination reference range.

(2) In the act-of-looking-aside determination device according to (1) described above, the relative direction acquirer executes the arithmetic operation to acquire the relative direction information when the surrounding information acquirer detects a lane change of the other vehicle to the own lane where the own vehicle is traveling.

(3) In the act-of-looking-aside determination device according to (1) described above, when an XY orthogonal coordinates system is set with a center of a plane projection of the own vehicle as an origin, a traveling direction of the own vehicle as an X-axis, and a vehicle width direction of the own vehicle as a Y-axis, the relative direction acquirer acquires, as an angle, the relative direction of the other vehicle by an arithmetic operation, the angle being formed between the X-axis and a straight line extending from the origin to a central part in a width direction of a rear of the other vehicle.

(4) The act-of-looking-aside determination device according to (1) described above further includes a notifier (for example, a notifier 3 to be described below) that gives a predetermined notification to the driver when the act-of-looking-aside determiner determines that the driver is looking aside. The notifier stops giving the predetermined notification at a timing when the relative direction acquirer starts the arithmetic operation to acquire the relative direction.

(5) In the act-of-looking-aside determination device according to (1) described above, the curve detector detects a curvature of the curve together with the curve direction of the curve, and the determination reference range changer changes the determination reference range using information related to the curvature of the curve detected by the curve detector.

(6) In the act-of-looking-aside determination device according to (1) described above, the act-of-looking-aside determination device further includes a vehicle state acquirer (for example, a vehicle state acquirer 25 to be described) that acquires, based on a detection output from a predetermined vehicle state sensor provided on the own vehicle, vehicle information related to a state of the own vehicle, the vehicle information including information on a steering angle and/or a turning angle of the own vehicle, wherein the determination reference range changer changes the determination reference range using the information on the steering angle and/or the turning angle of the own vehicle acquired by the vehicle state acquirer.

According to the act-of-looking-aside determination device of (1), based on the information on the curve direction detected by the curve detector, the determination reference range changer changes the determination reference range in the act-of-looking-aside determiner by the predetermined angle in the curve direction. On the other hand, when the line-of-sight direction detected by the line-of-sight direction detector is within the predetermined range from the relative direction of the other vehicle acquired by the relative direction acquirer, the act-of-looking-aside determiner does not determine that the driver is looking aside even when the line-of-sight direction is out of the determination reference range not corresponding to the act of looking aside. Thus, the erroneous determination of the act of looking aside is prevented in the case where another vehicle exhibits a behavior of getting out of its lane and/or cutting into the lane of the own vehicle.

According to the act-of-looking-aside determination device of (2), in the act-of-looking-aside determination device of (1) described above, the relative direction acquirer executes an arithmetic operation for acquiring the relative direction information when the surrounding information acquirer detects that the other vehicle changes the lane to the own lane where the own vehicle is traveling. Therefore, it is possible to determine the act of looking aside more appropriately by adding the other vehicle's behavior of getting out of its lane and/or cutting into the lane where the own vehicle is traveling, to the determination factor.

According to the act-of-looking-aside determination device of (3), in the act-of-looking-aside determination device of (1) described above, the determination reference range changer changes the predetermined range using the relative direction information indicating the relative direction of the other vehicle acquired by the relative direction acquirer as viewed from the own vehicle. Therefore, it is possible to determine the act of looking aside more appropriately by adding the relative direction between the own vehicle and the vehicle to the determination factor.

According to the act-of-looking-aside determination device of (4), in the act-of-looking-aside determination device of (1) described above, at the timing when the relative direction acquirer starts the arithmetic operation related to the detection of the relative direction, it is highly probable that the driver of the own vehicle is turning his/her line of sight for safety confirmation, and the notification such as an alarm in the notifier is stopped at such a timing. Thus, notifications such as unnecessary alarms are unlikely to be given, and comfortability during driving is unlikely to be hindered.

According to the act-of-looking-aside determination device of (5), in the act-of-looking-aside determination device of (1) described above, the determination reference range changer also changes the determination reference range using the information related to the curvature of the curve detected by the curve detector. Therefore, it is possible to determine the act of looking aside more appropriately by adding the curvature of the curve to the determination factor.

According to the act-of-looking-aside determination device of (6), in the act-of-looking-aside determination device of (1) described above, the determination reference range changer changes the determination reference range using the information on the steering angle and/or the turning angle of the own vehicle acquired by the vehicle state acquirer. Therefore, it is possible to determine the act of looking aside more appropriately by adding the information on the steering angle and/or the turning angle of the own vehicle to the determination factor.

BRIEF DESCRIPTION OF THE DRAWINGS

FIG. 5 is a flowchart showing an example of processing performed by a processing device of the act-of-looking-aside determination device according to the embodiment of the present invention.

DETAILED DESCRIPTION OF THE INVENTION

Figure 1:
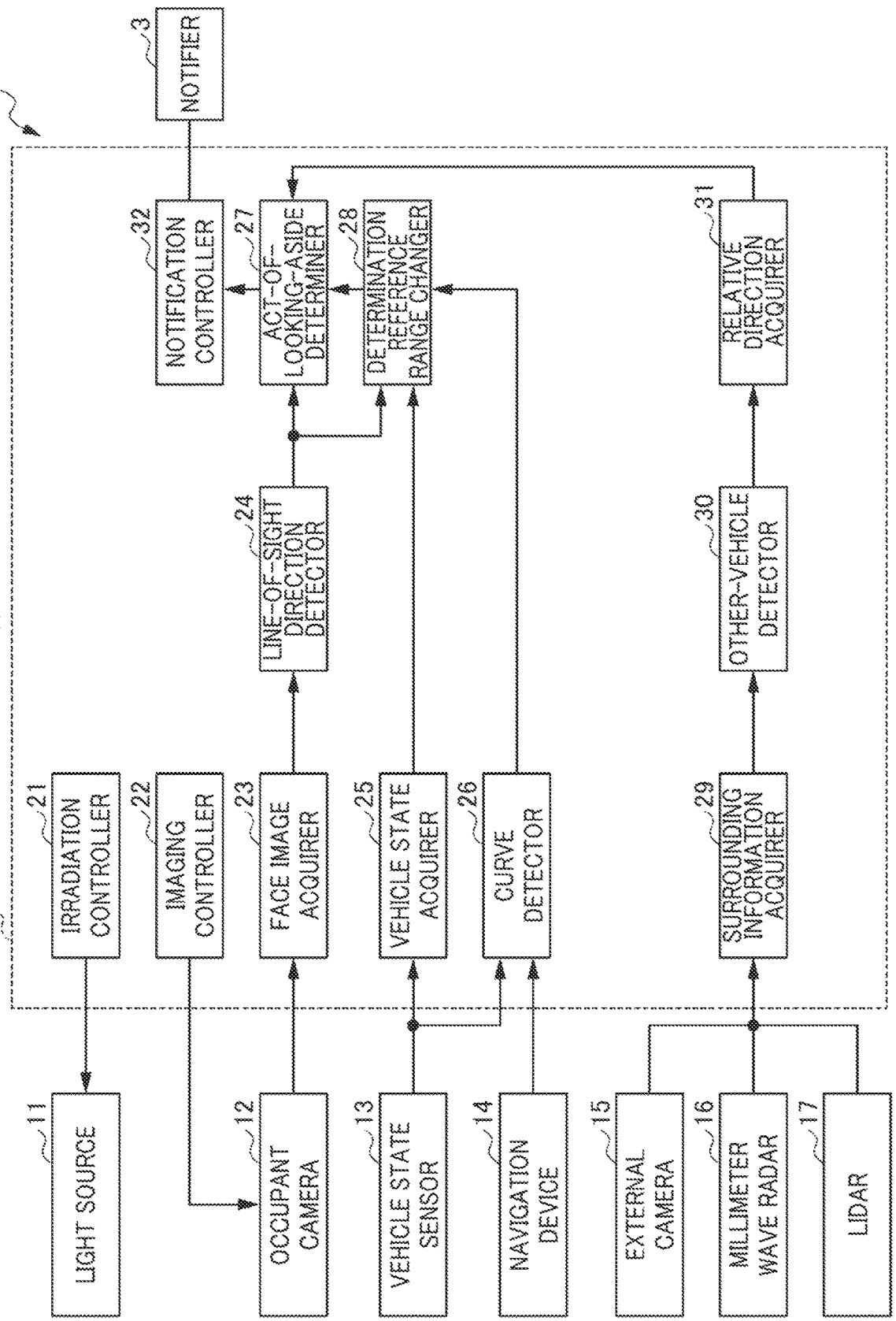
FIG. 1 is a diagram showing a configuration of an act-of-looking-aside determination device according to an embodiment of the invention.

Hereinafter, the present invention will be clarified by a detailed description of an act-of-looking-aside determination device according to an embodiment of the present invention. FIG. 1 is a diagram showing a configuration of an act-of-looking-aside determination device 1 according to an embodiment of the invention. The act-of-looking-aside determination device 1 is provided in a vehicle, and includes a processing device 2, a notifier 3, a light source 11, an occupant camera 12, a vehicle state sensor 13, a navigation device 14, an external camera 15, a millimeter wave radar 16, and an LIDAR 17.

The light source 11 irradiates an imaging target (for example, a face of a driver seated in a driver's seat) with light such as visible light or infrared rays.

The occupant camera 12 is installed to come at least a face of the driver seated in the driver's seat within an imaging field of view, and obtains a video output including the face of the driver in a visible light region or an infrared region.

The vehicle state sensor 13 includes a vehicle velocity sensor, a gyro sensor, a yaw rate sensor, and a steering angle sensor. The vehicle velocity sensor detects a velocity (vehicle velocity) of the own vehicle, the gyro sensor detects a posture of a vehicle body or a traveling direction, and the yaw rate sensor detects a yaw rate (rotating angular velocity of axial rotation in an up and down direction of a gravity center of the vehicle). Further, the steering angle sensor detects a steering angle of a steering wheel operated by the driver or an actual steering angle (turning angle) according to the steering angle of the steering wheel. The vehicle state sensor 13 supplies signals related to the vehicle velocity, the posture, the yaw rate, the steering angle, and the turning angle, which are various kinds of vehicle information detected as described above, to the processing device 2.

The navigation device 14 receives a positioning signal such as a GPS (Global Positioning System) signal for measuring the position of the own vehicle using artificial satellites, and calculates a current position of the own vehicle based on the positioning signal. The navigation device 14 calculates the current position of the own vehicle by a calculation process of dead reckoning based on the detection signals of the velocity (vehicle velocity) and the yaw rate of the own vehicle output from the vehicle velocity sensor and the yaw rate sensor (not shown) of the vehicle state sensor 13.

The navigation device 14 includes road coordinate data, as map data, required for a map matching process based on the current position of the own vehicle. Further, the navigation device 14 includes data, as the map data, necessary for a process such as a route search or a route guide, the data being road data of nodes that are coordinate points formed of latitude and longitude of a predetermined position such as an intersection and a junction, links connecting nodes to each other, a distance between the links, and a shape (for example, information about a radius of curvature of a curve), a width, an intersection angle, and a kind of road.

The external camera 15 is installed to come at least an outside of the vehicle including surroundings of the vehicle within an imaging field of view, and acquires imaging information in a visible light region or an infrared region. Although the external camera 15 is typically shown as one block in FIG. 1, a plurality of external cameras is provided according to specifications of the vehicle.

The millimeter wave radar 16 detects a target around the vehicle, and measures a distance from the target. Although the millimeter wave radar 16 is typically shown as one block in FIG. 1, a plurality of millimeter wave radars is provided according to specifications of the vehicle.

The light detection and ranging (LIDAR) 17 detects a target around the vehicle, and measures a distance from the target. Although the LIDAR 17 is typically shown as one block in FIG. 1, a plurality of LIDARs is provided according to specifications of the vehicle.

The processing device 2 includes an irradiation controller 21, an imaging controller 22, a face image acquirer 23, a line-of-sight direction detector 24, a vehicle state acquirer 25, a curve detector 26, an act-of-looking-aside determiner 27, a determination reference range changer 28, a surrounding information acquirer 29, an other-vehicle detector 30, a relative direction acquirer 31, and a notification controller 32.

The irradiation controller 21 controls irradiation with light by the light source 11. The imaging controller 22 controls the occupant camera 12 to capture an image. The face image acquirer 23 acquires a face image output from the occupant camera 12. The line-of-sight direction detector 24 performs a recognition process such as feature quantity calculation and shape determination on a detection target, for example, left and right eyeballs of the driver, from the face image acquired by the face image acquirer 23. The line-of-sight direction detector 24 further detects, based on the result of the recognition process, a line of sight and a gaze point of the driver by a predetermined line-of-sight detecting process using, for example, a center position of the irises and pupils of the eyes, a center position of a Purkinje image that is a reflection image of infrared rays on the cornea surface, a center position of the eyeballs, and positions of edges of eyelids.

The vehicle state acquirer 25 acquires vehicle state information about various states of the own vehicle based on the signals of the various detection results output from the vehicle state sensor. In other words, the vehicle state acquirer 25 acquires, as information of a driving behavior of the own vehicle, information of the velocity (vehicle velocity) of the own vehicle, a posture of the vehicle body, a traveling direction, a turning direction, and an actual steering angle (turning angle) according to a steering angle of a steering wheel.

The curve detector 26 detects the presence or absence of a curve in front of the vehicle within a predetermined distance (for example, a distance within 2 seconds until reaching an entrance of a curve) from the own vehicle and detects a curve direction of the curve, based on the road data of the navigation device 14 or any one of the steering angle of the steering wheel and the actual steering angle (turning angle) according to the steering angle of the steering wheel output from the vehicle state sensor 13, and supplies the detection output to the determination reference range changer 28.

The curve detector 26 also detects a curvature of the curve in addition to the presence or absence of the curve in front of the vehicle within a predetermined distance from the own vehicle and the curve direction of the curve.

The act-of-looking-aside determiner 27 determines, based on the line-of-sight direction of the driver detected by the line-of-sight direction detector 24, whether the driver is looking aside. In other words, the act-of-looking-aside determiner 27 determines whether the line-of-sight direction of the driver is within a determination reference range not corresponding to the act of looking aside. When it is determined that the line-of-sight direction of the driver is out of the determination reference range for a predetermined time or longer, the act-of-looking-aside determiner 27 further issues a determination output of the act of looking aside. On the other hand, when it is determined that the line-of-sight direction of the driver is within the determination reference range, the act-of-looking-aside determiner 27 issues a determination output of a non-act of looking aside.

The determination reference range in the act-of-looking-aside determiner 27 is changed by the determination reference range changer 28 to be described below according to various conditions. Thus, it is possible to prevent the determination of the act of looking out by the act-of-looking-aside determiner 27 from becoming erroneous in view of the actual driving situation of the driver.

The determination reference range changer 28 issues a command to the act-of-looking-aside determiner 27 to change the determination reference range in the act-of-looking-aside determiner 27 by a predetermined amount, based on information on the steering angle and/or the turning angle of the own vehicle, which is the vehicle state information acquired by the vehicle state acquirer 25, information indicating the presence or absence of the curve, the curve direction of the curve, and the curvature of the curve detected by the curve detector 26, information indicating the line-of-sight direction detected by the line-of-sight direction detector 24, and detection information related to the relative position of another vehicle from the relative direction acquirer 31 to be described below.

When the curve is present in front of the own vehicle within the predetermined range and the curve direction of the curve is detected by the curve detector 26, the determination reference range changer 28 changes the determination reference range in the curve direction by a predetermined amount at a predetermined timing before the turning direction of the own vehicle changes to the curve direction based on the vehicle state information acquired by the vehicle state acquirer 25. At such a predetermined timing, it is highly probable that the driver of the own vehicle is turning his/her line of sight in the curve direction for safety confirmation, but in such a case, erroneous determination is avoided that the driver is looking aside. In particular, the determination reference range changer 28 also changes the predetermined range using the information related to the curvature of the curve detected by the curve detector 26. Therefore, it is possible to determine the act of looking aside more appropriately by adding the curvature of the curve to the determination factor.

The predetermined timing before the turning direction of the own vehicle changes to the curve direction means a time, for example, when the line-of-sight direction detected by the line-of-sight direction detector 24 deviates from the determination reference range set at this time toward the curve direction side and is directed to a range out of the determination reference range.

The surrounding information acquirer 29 acquires surrounding information related a state around the own vehicle from the external camera 15, the millimeter wave radar 16, and the LIDAR 17. The surrounding information is, for example, information on the presence or absence of another vehicle or other obstacles in front, side, and rear of the own vehicle, or information on a distance to the existing other vehicle or other obstacles and an orientation. The surrounding information acquirer 29 supplies the acquired surrounding information to the other-vehicle detector 30.

Based on the detection output supplied from the curve detector 26 and related to the presence or absence of the curve in front of the own vehicle within the predetermined distance and the curve direction of the curve and the surrounding information supplied from the surrounding information acquirer 29, the other-vehicle detector 30 detects the presence or absence and a relative position of other vehicles in a lane that is adjacent, in a direction opposite to the curve direction detected by the curve detector 26, to the own lane where the own vehicle travels while the own vehicle is traveling around the curve, and issues the detection information.

When the presence of another vehicle is detected by the other-vehicle detector 30, the relative direction acquirer 31 acquires, based on the detection output of the other-vehicle detector 30, relative direction information indicating a relative direction of the other vehicle as viewed from the own vehicle by an arithmetic operation, and supplies the relative direction information to the act-of-looking-aside determiner 27. The relative direction information is information indicating an angle $\alpha \pm \theta$ to be described below.

The determination reference range changer 28 issues a command to the act-of-looking-aside determiner 27 to change the determination reference range in the act-of-looking-aside determiner 27 by a predetermined amount, based on the detection information related to the relative position of the other vehicle from the relative direction acquirer 31 in addition to the vehicle information acquired by the vehicle state acquirer 25 described above, the information on the presence or absence of the curve and the curve direction of the curve detected by the curve detector 26, and information indicating the line-of-sight direction detected by the line-of-sight direction detector 24.

The act-of-looking-aside determiner 27 changes the determination reference range in response to the command from the determination reference range changer 28 to change the determination reference range by the predetermined amount, and issues a determination output of a non-act of looking aside when the line-of-sight direction detected by the line-of-sight direction detector 24 is within the changed determination reference range. On the other hand, when it is determined that the line-of-sight direction of the driver is out of the determination reference range for the predetermined time or longer, the act-of-looking-aside determiner 27 issues a determination output of the act of looking aside.

Here, upon receiving, from the relative direction acquirer 31, the relative direction information indicating the relative direction of the other vehicle as viewed from the own vehicle as described above, the act-of-looking-aside determiner 27 issues the determination output of the non-act of looking aside even when the line-of-sight direction detected by the line-of-sight direction detector 24 is out of the determination reference range for the predetermined time or longer.

The determination output of the act-of-looking-aside determiner 27 is supplied to the notification controller 32. When the determination output supplied from the act-of-looking-aside determiner 27 is the determination output of the act of looking aside, the notification controller 32 gives an alarm issuing control command to the notifier 3 and controls a form of alarm issued in the notifier 3. An example of the form of the alarm issued by the notifier 3 includes strength/weakness and an intermittent cycle of an alarm sound, sounding of a message, a light emission and a character display of a warning light, or a pattern display.

When performing notification under the control of the notification controller 32, the notifier 3 stops the notification at a timing when the relative direction acquirer 31 starts the arithmetic operation related to the acquisition of the relative direction. At the timing when the relative direction acquirer starts the arithmetic operation related to the detection of the relative direction, it is highly probable that the driver of the own vehicle is turning his/her line of sight for safety confirmation, and thus the notification such as an alarm in the notifier is stopped at this timing. Thus, notifications such as unnecessary alarms are prevented, and comfortability during driving is hardly hindered.

Next, an operation of the act-of-looking-aside determination device 1 will be described with reference to FIGS. 2 to 4 and FIG. 1 in a case where the act-of-looking-aside determination device 1 according to the embodiment of the present invention determines that there is a possibility that the other vehicle gets out of a lane and cuts into the lane where the own vehicle is traveling.

Figure 2:
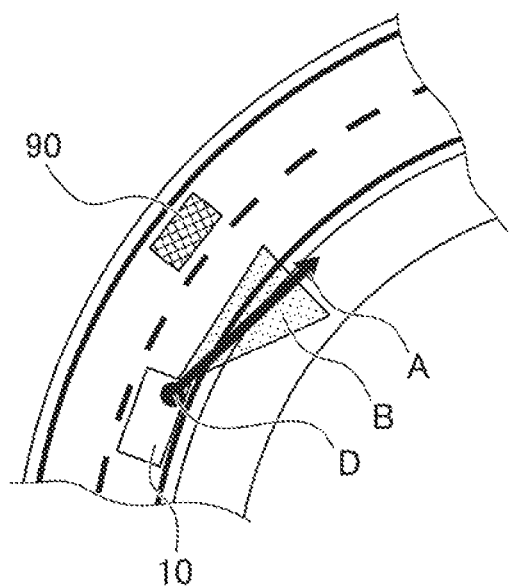
FIG. 2 is a diagram showing a case where the act-of-looking-aside determination device according to the embodiment of the present invention determines that there is a possibility that another vehicle will get out of a lane and cut into a lane where an own vehicle is traveling.

FIG. 2 is a diagram showing a case where the act-of-looking-aside determination device 1 according to the embodiment of the present invention determines that there is a possibility that the other vehicle will get out of a lane and cut into the lane where the own vehicle is traveling. In FIG. 2, an own vehicle 10 equipped with the act-of-looking-aside determination device 1 is approaching a curve. At this time, a line-of-sight direction A of a driver D is closer to an inner peripheral side of the curve, which is a front field of view of the driver D, than a tangential direction with respect to the curve, which is a current traveling direction of the own vehicle 10. Character B shown in FIG. 2 indicates a determination reference range that is used as a reference for the act-of-looking-aside determiner 27 to determine whether the driver 10 is looking aside.

In FIG. 2, the line-of-sight direction A is constantly grasped by the line-of-sight direction detector 24 of the act-of-looking-aside determination device 1. The curve detector 26 detects the presence or absence of the curve in front of the own vehicle 10 within a predetermined distance (for example, a distance within 2 seconds until reaching an entrance of a curve) and detects the curve direction of the curve. The curve detector 26 supplies the detection output related to the curve to the determination reference range changer 28 and the other-vehicle detector 30.

On the other hand, the surrounding information acquirer 29 acquires information on the presence or absence of another vehicle 90 and other obstacles in front, side, and rear of the own vehicle, or information on a distance to the existing other vehicle 90 and other obstacles and an orientation. The state of FIG. 2 is a state in which the surrounding information acquirer 29 acquires the information indicating that there is a possibility that the other vehicle 90 will get out of the lane and cut into the lane where the own vehicle is traveling.

In this case, based on the detection output supplied from the curve detector 26 and related to the presence or absence of the curve in front of the own vehicle 10 within the predetermined distance and the curve direction of the curve and the surrounding information supplied from the surrounding information acquirer 29, the other-vehicle detector 30 further detects the presence or absence and a relative position of the other vehicle in the lane that is adjacent, in a direction opposite to the curve direction detected by the curve detector 26, to the own lane where the own vehicle travels, while the own vehicle 10 is traveling around the curve, and issues the detection information.

When the presence of the other vehicle 90 is detected by the other-vehicle detector 30, the relative direction acquirer 31 acquires, based on the detection output of the other-vehicle detector 30, relative direction information indicating the relative direction of the other vehicle 90 as viewed from the own vehicle 10 by an arithmetic operation, and supplies the relative direction information to the determination reference range changer 28.

Figure 3:
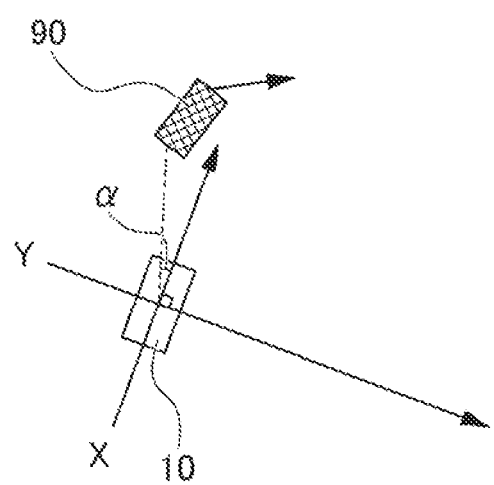
FIG. 3 is a diagram illustrating a case where a relative direction acquirer calculates a relative direction of the other vehicle in FIG. 2 as viewed from the own vehicle.

FIG. 3 is a diagram illustrating a case where the relative direction acquirer 31 calculates the relative direction of the other vehicle 90 in FIG. 2 as viewed from the own vehicle 10. An XY orthogonal coordinates system is set with a center of a plane projection of the own vehicle 10 as an origin, a traveling direction of the own vehicle 10 as an X-axis, and a vehicle width direction of the own vehicle 10 as a Y-axis, and the relative direction of the other vehicle 90 as viewed from the own vehicle 10 is acquired as an angle $\alpha$ by an arithmetic operation, the angle $\alpha$ being formed between the X-axis and a straight line shown by a broken line extending from the origin of the XY orthogonal coordinates system to a central part in the width direction of a rear of the other vehicle 90.

Figure 4:
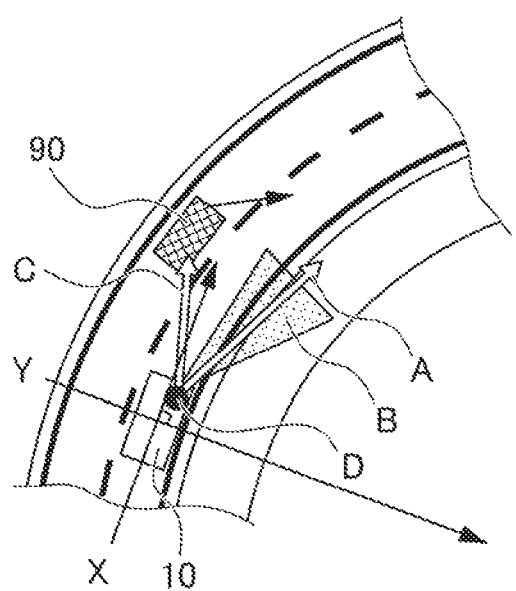
FIG. 4 is a diagram illustrating a case of a determination that a driver is looking aside is not made even when the driver turns his/her line of sight in a direction deviating from a determination reference range.

FIG. 4 is a diagram illustrating a case where a determination that the driver D is looking aside is not made even when the driver D turns his/her line of sight in a direction deviating from the determination reference range B. When the driver D of the own vehicle 10 finds another vehicle 90 that may get out of a lane and cut into the lane where the own vehicle is traveling, the driver necessarily turns his/her line of sight to the other vehicle 90 as indicated by a white arrow line C. The driver D turns his/her line of sight to the direction of C inherently for the purpose of securing safety. However, the direction of the line of sight of the driver D in the case indicated by the arrow line C is a direction deviating from the determination reference range B set for the determination of the act of looking aside. Therefore, if no measures are taken, it is determined that the line-of-sight direction C of the driver D is in a state of looking aside.

In other words, the act-of-looking-aside determiner 27 supplies the determination output indicating the act of looking aside to the notification controller 32. In response to this, the notification controller 32 gives an alarm issuing control command to the notifier 3 to cause the notifier 3 to issue an alarm such as an alarm sound, sounding of a message, a light emission and a character display of a warning light, or a pattern display.

The act-of-looking-aside determination device 1 according to the embodiment of the present invention eliminates the inconvenience that even movement of the line of sight that is inherently for securing safety is determined to be the act of looking aside. In other words, as described with reference to FIG. 3, the relative direction acquirer 31 acquires, as the angle $\alpha$, the relative direction of the other vehicle 90 as viewed from the own vehicle 10, the angle $\alpha$ being formed by the straight line extending from the origin to the other vehicle 90 in the XY orthogonal coordinates system set in the own vehicle 10, and it is not determined that the driver D is looking aside when the line-of-sight direction of the driver D is directed toward the angle $\alpha$. Thus, the erroneous determination of the act of looking aside is prevented in the case where the other vehicle 90 exhibits a behavior of getting out of its lane and/or cutting into the lane of the own vehicle. In this case, more specifically, when the line-of-sight direction of the driver D is at the angle $\alpha \pm \theta$ obtained by adding a range fine adjustment parameter (margin angle for absorbing detection error and tolerance)$\pm \theta$ to the angle $\alpha$, it is not determined that the driver D is looking aside.

FIG. 5 is a flowchart showing an example of processing performed by the processing device 2 of the act-of-looking-aside determination device 1 according to the embodiment of the present invention. First, the line-of-sight direction detector 24 detects the line-of-sight direction of the driver by a predetermined line-of-sight detecting process (step S1).

Next, the curve detector 26 detects the presence or absence of a curve in front of the vehicle within a predetermined distance from the own vehicle and detects a curve direction of the curve and a curvature of the curve, based on the road data of the navigation device 14 or any one of the steering angle of the steering wheel and the actual steering angle (turning angle) according to the steering angle of the steering wheel output from the vehicle state sensor 13 (step S2).

Next, the determination reference range changer 28 issues a command to the act-of-looking-aside determiner 27 to change the determination reference range in the act-of-looking-aside determiner 27 by a predetermined amount, based on the vehicle state information acquired by the vehicle state acquirer 25, the information indicating the presence or absence of the curve, the curve direction of the curve, and the curvature of the curve detected by the curve detector 26, the information indicating the line-of-sight direction detected by the line-of-sight direction detector 24, and detection information related to the relative position of the other vehicle from the relative direction acquirer 31. The act-of-looking-aside determiner 27 changes the determination reference range by a predetermined amount based on such a command (step S3).

In step S3, after the act-of-looking-aside determiner 27 changes the determination reference range by the predetermined amount, a case is assumed in which the other-vehicle detector 30 detects the presence or absence and the relative position of the other vehicle in the lane that is adjacent, in the direction opposite to the curve direction detected by the curve detector 26, to the own lane where the own vehicle travels, while the own vehicle is traveling around the curve (step S4).

In the case of the assumption of step S4, the relative direction acquirer 31 acquires, based on the detection output of the other-vehicle detector 30, the information indicating the angle $\alpha \pm \theta$ described above, which is the relative direction information indicating the relative direction of the other vehicle as viewed from the own vehicle by the arithmetic operation, and supplies the relative direction information to the act-of-looking-aside determiner 27 (step S5).

Next, upon receiving, from the relative direction acquirer 31, the relative direction information indicating the relative direction of the other vehicle as viewed from the own vehicle as described above, the act-of-looking-aside determiner 27 cancels the determination of the act of looking aside even when the line-of-sight direction detected by the line-of-sight direction detector 24 is out of the determination reference range for the predetermined time or longer (step S6). Thus, a situation is prevented in which even movement of the line of sight that is performed inherently for securing safety in the case where another vehicle exhibits a behavior of getting out of its lane and/or cutting into the lane of the own vehicle is determined to be the act of looking aside.

According to the act-of-looking-aside determination device 1 of the present embodiment, the following effects are obtained.

In the act-of-looking-aside determination device 1 of (1), based on the information on the curve direction detected by the curve detector 26, the determination reference range changer 28 changes the determination reference range in the act-of-looking-aside determiner 27 by the predetermined angle in the curve direction. On the other hand, when the line-of-sight direction detected by the line-of-sight direction detector 24 is within the predetermined range from the relative direction of the other vehicle acquired by the relative direction acquirer 31, the act-of-looking-aside determiner does not determine that the driver is looking aside even when the line-of-sight direction is out of the determination reference range not corresponding to the act of looking aside. Thus, the erroneous determination of the act of looking aside is prevented in the case where another vehicle exhibits a behavior of getting out of its lane and/or cutting into the lane of the own vehicle.

In the act-of-looking-aside determination device 1 of (2), the relative direction acquirer 31 executes an arithmetic operation for acquiring the relative direction information when the surrounding information acquirer 29 detects that the other vehicle changes the lane to the own lane where the own vehicle is traveling. Therefore, it is possible to determine the act of looking aside more appropriately by adding the other vehicle's behavior of getting out of its lane and/or cutting into the lane where the own vehicle is traveling, to the determination factor.

In the act-of-looking-aside determination device 1 of (3), the determination reference range changer 28 changes the predetermined range using the relative direction information indicating the relative direction of the other vehicle acquired by the relative direction acquirer 31 as viewed from the own vehicle. Therefore, it is possible to determine the act of looking aside more appropriately by adding the relative direction between the own vehicle and the other vehicle to the determination factor.

In the act-of-looking-aside determination device 1 of (4), at the timing when the relative direction acquirer 31 starts the arithmetic operation related to the detection of the relative direction, it is highly probable that the driver of the own vehicle is turning his/her line of sight for safety confirmation, and the notification such as an alarm in the notifier is stopped at such a timing. Thus, notifications such as unnecessary alarms are unlikely to be given, and comfortability during driving is unlikely to be hindered.

In the act-of-looking-aside determination device 1 of (5), the determination reference range changer 28 also changes the determination reference range using the information related to the curvature of the curve detected by the curve detector 26. Therefore, it is possible to determine the act of looking aside more appropriately by adding the curvature of the curve to the determination factor.

In the act-of-looking-aside determination device 1 of (6), the determination reference range changer 28 changes the determination reference range using the information on the steering angle and/or the turning angle of the own vehicle acquired by the vehicle state acquirer 25. Therefore, it is possible to determine the act of looking aside more appropriately by adding the information on the steering angle and/or the turning angle of the own vehicle to the determination factor.

It should be noted the present invention is not limited to the embodiment described above. Within the scope of the present invention, the detailed configuration may be changed as appropriate. For example, when a request for cutting into the traveling lane of the own vehicle is received from the other vehicle by vehicle-to-vehicle communication, the relative direction of the other vehicle, which is a transmission source of the vehicle-to-vehicle communication, may be acquired without any other conditions, and it may not be determined that the line-of-sight direction along the acquired relative direction is in the state of looking aside.

EXPLANATION OF REFERENCE NUMERALS

1: Act-of-looking-aside determination device
2: Processing device
3: Notifier
10: Own vehicle
11: Light source
12: Occupant camera
13: Vehicle state sensor
14: Navigation device
15: External camera
16: Millimeter wave radar
17: LIDAR
21: Irradiation controller
22: Imaging controller
23: Face image acquirer
24: Line-of-sight direction detector
25: Vehicle state acquirer
26: Curve detector
27: Act-of-looking-aside determiner
28: Determination reference range changer
29: Surrounding information acquirer
30: Other-vehicle detector
31: Relative direction acquirer
32: Notification controller

What is claimed is:

1. An act-of-looking-aside determination device comprising:
a line-of-sight direction detector that detects a line-of-sight direction of a driver;
an act-of-looking-aside determiner that determines that the driver is looking aside when the line-of-sight direction detected by the line-of-sight direction detector deviates from a predetermined determination reference range;
a curve detector that detects presence or absence of a curve in front of an own vehicle within a predetermined distance from the own vehicle, and detects a curve direction of the curve, and outputs a detection result;
a surrounding information acquirer that acquires surrounding information of the own vehicle;

an other-vehicle detector that detects, based on the surrounding information of the own vehicle, presence or absence of an other vehicle in a lane that is adjacent, in a direction opposite to the curve direction detected by the curve detector, to an own lane where the own vehicle travels while the own vehicle is traveling around the curve;

a determination reference range changer that, when the own vehicle enters the curve, changes the determination reference range in the act-of-looking-aside determiner by a predetermined angle in the curve direction detected by the curve detector; and a relative direction acquirer that acquires, by an arithmetic operation, relative direction information indicating a relative direction of the other vehicle as viewed from the own vehicle, wherein when the line-of-sight direction detected by the line-of-sight direction detector is within a predetermined range from the relative direction of the other vehicle acquired by the relative direction acquirer, the act-of-looking-aside determiner does not determine that the driver is looking aside even when the line-of-sight direction is out of the determination reference range.

2. The act-of-looking-aside determination device according to claim 1, wherein
the relative direction acquirer executes the arithmetic operation to acquire the relative direction information when the surrounding information acquirer detects a lane change of the other vehicle to the own lane where the own vehicle is traveling.

3. The act-of-looking-aside determination device according to claim 1, wherein
when an XY orthogonal coordinates system is set with a center of a plane projection of the own vehicle as an origin, a traveling direction of the own vehicle as an X-axis, and a vehicle width direction of the own vehicle as a Y-axis, the relative direction acquirer acquires, as an angle, the relative direction of the other vehicle by an arithmetic operation, the angle being formed between the X-axis and a straight line extending from the origin to a central part in a width direction of a rear of the other vehicle.

4. The act-of-looking-aside determination device according to claim 1, further comprising:
a notifier that gives a predetermined notification to the driver when the act-of-looking-aside determiner determines that the driver is looking aside, wherein
the notifier stops giving the predetermined notification at a timing when the relative direction acquirer starts the arithmetic operation to acquire the relative direction.

5. The act-of-looking-aside determination device according to claim 1, wherein
the curve detector detects a curvature of the curve together with the curve direction of the curve, and
the determination reference range changer changes the determination reference range using information related to the curvature of the curve detected by the curve detector.

6. The act-of-looking-aside determination device according to claim 1, further comprising:
a vehicle state acquirer that acquires, based on a detection output from a predetermined vehicle state sensor provided on the own vehicle, vehicle information related to a state of the own vehicle, the vehicle information including information on a steering angle and/or a turning angle of the own vehicle, wherein
the determination reference range changer changes the determination reference range using the information on the steering angle and/or the turning angle of the own vehicle acquired by the vehicle state acquirer.

* * * * *